Figure 1:
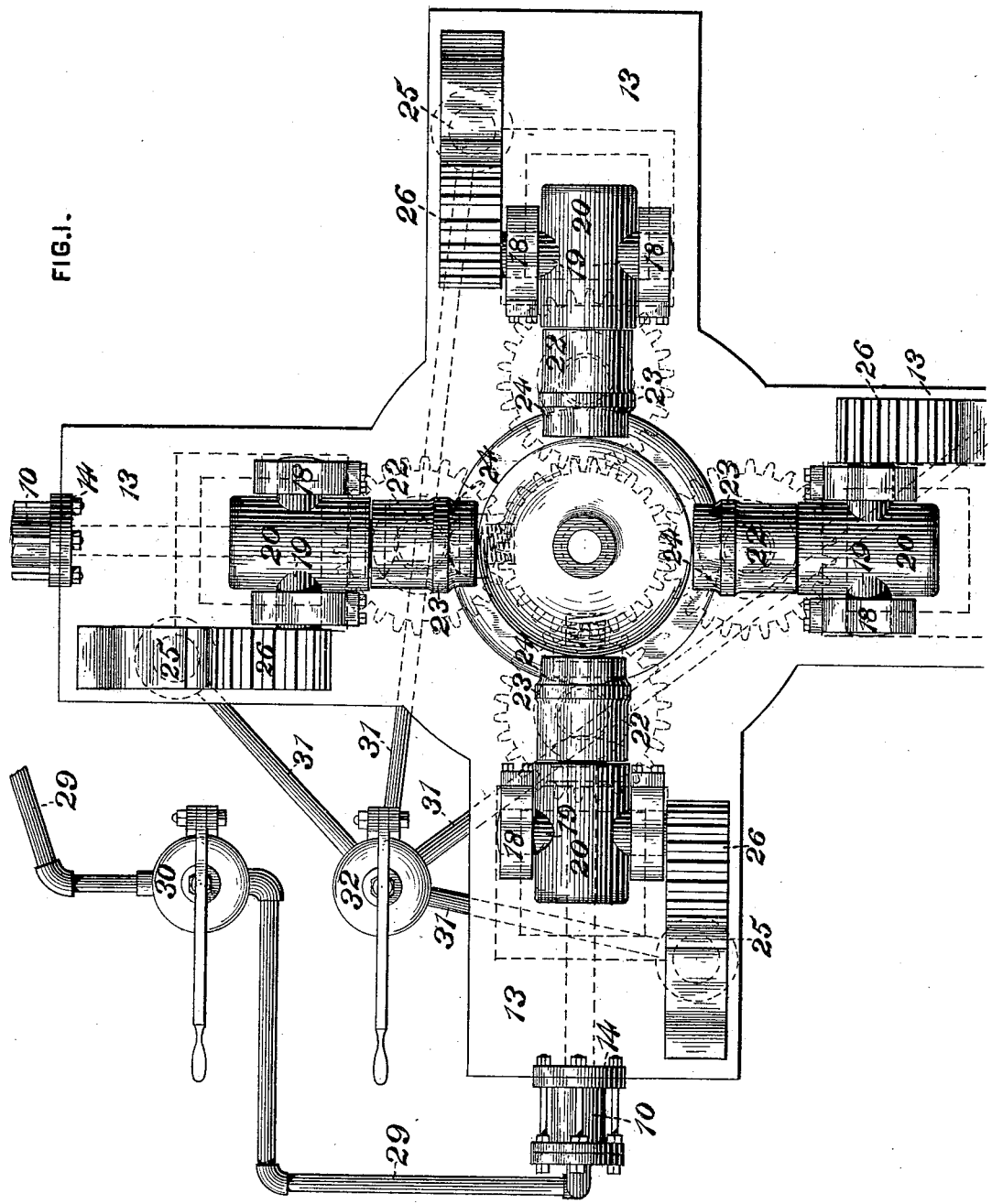

(No Model.) 2 Sheets—Sheet 1.

R. BAGALEY.
MACHINE FOR TRUING CAR WHEELS.

No. 377,224. Patented Jan. 31, 1888.

WITNESSES:
M. S. Murphy.
F. E. Gaither.

INVENTOR,
Ralph Bagaley
by Darwin S. Wolcott
Att'y.

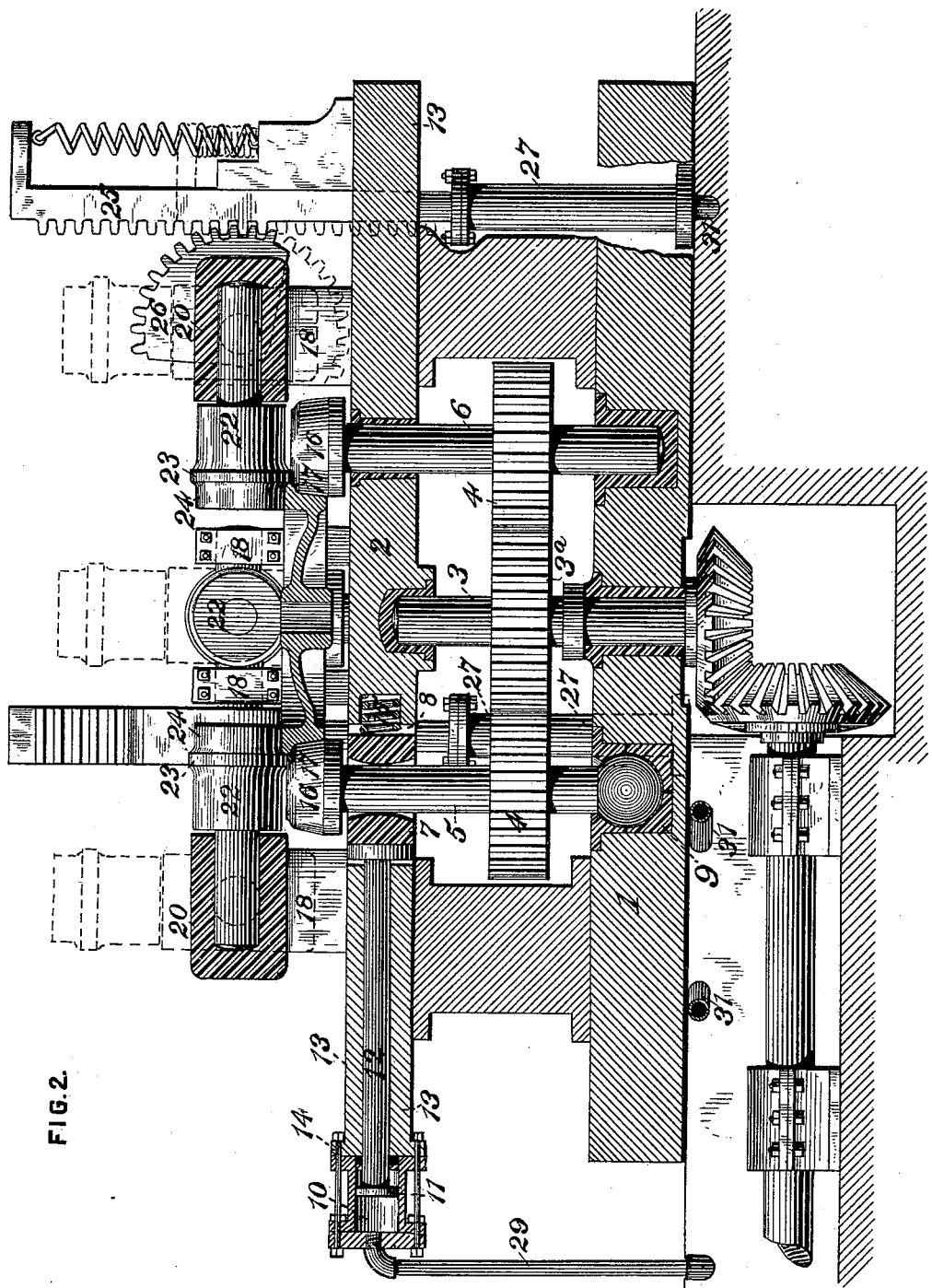

UNITED STATES PATENT OFFICE.

RALPH BAGALEY, OF PITTSBURG, PENNSYLVANIA.

MACHINE FOR TRUING CAR-WHEELS.

SPECIFICATION forming part of Letters Patent No. 377,224, dated January 31, 1888.

Application filed November 7, 1887. Serial No. 254,538. (No model.)

*To all whom it may concern:*

Be it known that I, RALPH BAGALEY, residing at Pittsburg, in the county of Allegheny and State of Pennsylvania, a citizen of the United States, have invented or discovered certain new and useful Improvements in Machines for Truing and Finishing Car-Wheels, of which improvements the following is a specification.

The invention herein relates to certain improvements in machines for truing and hardening the treads or perimeters of car and other wheels, thereby insuring a true rolling movement of the wheel and a more durable wearing-surface; and the invention has for its object a construction of apparatus wherein the truing devices are caused to act not only on the treads of the wheels, but also upon the inner surfaces of the flanges, thereby increasing their durability and a uniformity of movement and wear of the wheel.

In general terms, the invention consists in the construction and combination of devices, all as hereinafter more fully described and claimed.

In the accompanying drawings, forming a part of this specification, Figure 1 is a top plan view of a machine embodying my invention; and Fig. 2 is a sectional view on the line $x$ $x$, Fig. 1.

In suitable bearings in the bed-plate 1 and top plate, 2, is mounted the power-shaft 3, having the pinion $3^a$ keyed thereto, said pinion intermeshing with pinions 4 on the vertical shafts 5 and 6, which are also mounted in suitable bearings in the plates 1 and 2. The shafts 6—two or more in number—are held by their bearings as against any movement except that of rotation. The bearings 7 of the shafts 5 are arranged to move horizontally in slots 8, formed in the top plate, while the lower ends of the shafts are formed with a ball, the bearings 9 being shaped to permit of the partial vertical rotation of the ball therein. The slots 8 are formed, as shown by dotted lines in Fig. 1, on radial lines, so as to permit of the shaft 5 being moved toward and from the oppositely-arranged shafts 6. The inward movements of the shafts 5 are effected by fluid-pressure in the cylinders 10 acting upon the pistons 11, whose rods 12 bear at their outer ends against the bearings 7. (See Fig. 2.)

The cylinders 10 are secured to the outer ends of two of the radial extensions 13 of the top plate, 2, the inner head, 14, of each cylinder being formed integral with said extensions, through which a guide-passage is formed for the piston-rods 12. The outward movements of the bearings 7 and shafts 5 are effected by springs 15, interposed between the bearings 7 and the inner ends of the slots 8. Such outward movements may be effected by a different arrangement or location of the springs 15, or by employing double-acting fluid-pressure cylinders and pistons and connecting the bearings to the piston-rods.

On the upper ends of the shafts 5 are formed or secured the rolls 16, having their operative faces constructed to impart the desired shape or contour to the perimeters of the wheels under operation. In operating on car-wheels the faces of the rolls 16 are made slightly conical, with grooves 17 at their upper ends constructed to form or operate on that half of the wheel-flange contiguous to the tread. The bearings of the shaft 6 are so located that the distance from the axis of the central power-shaft, 3, to the operative faces of the rolls 16 will be equal to the finished radius of the wheel to be rolled, and the slots 8 are so arranged that the rolls on the shafts 5 can be moved in an equal distance.

On each of the radial extensions 13 of the top plate are formed bearings 18, in which are mounted the trunnions 19 of the blocks 20, having openings formed therein for the reception of the shafts 21 of the rolls 22. The rolls 22 are formed with rims or collars 23 near their outer ends, said rims or collars being designed to bear upon the upper end of the rolls 16, thereby limiting the downward movements of the rolls 22, which are provided with grooves 24, designed to co-operate with the grooves 17 of the rolls 16 in truing and finishing the wheel-flange, and also to prevent any upward movement of the wheel under the action of the conical faces of the rolls 16.

In order to permit of the introduction of a wheel between the rolls 16, the rolls 20 are trued up into a vertical position by rack-bars 25, engaging toothed segments 26, secured to the trunnions 19 of the blocks 20. These rack-bars 25 are connected to the fluid-pressure cylinders 27, into which fluid-pressure is admitted for the purpose of turning down the rolls 22 into position for operation upon the rim and flange of the wheel. The rolls 22 are turned up by the springs 28, acting through the rack-bars 25 and segments 26. Such movement can, however, be effected by employing a double-acting cylinder or by a different arrangement or location of the springs 28.

In order to insure the simultaneous and equal movements of the rolls 16, the cylinders 10 are connected by pipes 29 to the regulating-valve 30, and the cylinders 27 are similarly connected by pipes 31 to the regulating-valve 32, said valves being preferably located as to be operated by a single operator.

In operating my improved machine the rolls 22 are first turned up to a vertical position and the shafts 5 are moved outwardly by the springs 15, so as to permit of the insertion of the car-wheel. When the latter has been adjusted in position, the shafts 5 are moved inward until the several rolls 16 bear firmly upon the treads of the wheels. The rolls 22 are then turned until the rims or collars 23 bear upon the rolls 16, which are then forced inwardly by the action of fluid-pressure in the cylinders 10. The faces of the rolls on the shafts 5 are brought to a distance from the oppositely-disposed rolls on the shafts 6 equal to the diameter desired in the finished wheel. Too great an inward movement of the shafts 5 is prevented by the bearings 7 engaging the inner ends of the slots 8.

In car-wheel-rolling machines as heretofore constructed the rolls operative on the treads have been provided with a groove operative on both sides of the flange; but it has been found to be difficult in practice to attain the desired hardness and finish on the face of the flange contiguous to the tread, by reason of the lifting action of the conical portions of the rolls forcing the wheel upward and lifting the inner face of the wheel-flange away from the face of groove designed to operate thereon. In my improved machine, however, as soon as the rolls 16 have taken a firm grasp upon the wheels the rolls 22 are brought down and the flange is finished by the action of the walls of the grooves 17 and 23. The rolls 16 are then forced inward, finishing the tread, the rolls 22 being held down on the rim of the wheel to prevent any upward movement thereof. In this way I am enabled to obtain the requisite finish of the inner face of the wheel-flange.

I claim herein as my invention—

1. In a machine for truing and finishing wheels, the combination of a series of positively-driven rolls operative on the tread and inner face of the flange of a wheel, and a series of rolls operative on the rim and outer face of the flange and movable toward and from the other series of rolls, thereby permitting of the direct insertion of the wheel between the positively-driven rolls, substantially as set forth.

2. In a machine for truing and finishing wheels, the combination of a series of positively-driven rolls operative on the tread and inner face of the flange of a wheel, and a series of frictionally-driven rolls operative on the outer face of the flange and serving to hold the wheel in engagement with the positively-driven rolls, substantially as set forth.

3. In a machine for truing and finishing wheels, the combination of a series of positively-driven rolls, one or more of said rolls being movable toward and from the other rolls, and a series of frictionally-driven rolls having their axes at an angle to the axes of the other rolls and movable toward and from the same, substantially as set forth.

4. In a machine for truing and finishing wheels, the combination of two or more vertically-arranged rolls, two or more similarly arranged rolls movable horizontally, and a fluid-pressure cylinder and piston for operating said movable rolls, substantially as set forth.

5. In a machine for truing and finishing wheels, the combination of two or more vertically-arranged rolls, two or more similarly arranged rolls movable horizontally, a series of rolls having their axes at an angle to the axes of the vertical rolls, a fluid-pressure cylinder and piston, and mechanism connecting the said rolls with said piston, substantially as set forth.

In testimony whereof I have hereunto set my hand.

RALPH BAGALEY.

Witnesses:
R. H. WHITTLESEY,
DARWIN S. WOLCOTT.